United States Patent
Yoshida (10) Patent No.: US 7,913,029 B2
(45) Date of Patent: Mar. 22, 2011

(54) INFORMATION RECORDING APPARATUS AND CONTROL METHOD THEREOF

(75) Inventor: Kenji Yoshida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 524 days.

(21) Appl. No.: 12/042,519

(22) Filed: Mar. 5, 2008

(65) Prior Publication Data

US 2008/0244188 A1 Oct. 2, 2008

(30) Foreign Application Priority Data

Mar. 26, 2007 (JP) ................. 2007-080134

(51) Int. Cl.
*G06F 12/00* (2006.01)
*G06F 12/16* (2006.01)

(52) U.S. Cl. ............ 711/4; 711/103; 711/111; 711/113; 711/152; 711/163

(58) Field of Classification Search ............... 711/4, 103, 711/111, 113, 152, 163
See application file for complete search history.

(56) References Cited

U.S. PATENT DOCUMENTS

| 6,192,450 B1* | 2/2001 | Bauman et al. ............... 711/135 |
| 2004/0117586 A1* | 6/2004 | Estakhri et al. ............... 711/203 |
| 2010/0077197 A1* | 3/2010 | Ergan et al. ..................... 713/2 |
| 2010/0088466 A1* | 4/2010 | Nakanishi et al. ............ 711/103 |
| 2010/0095053 A1* | 4/2010 | Bruce et al. ................... 711/103 |

FOREIGN PATENT DOCUMENTS

| JP | 02-109151 | 4/1990 |
| JP | 04-111030 | 4/1992 |
| JP | 05-066999 | 3/1993 |

* cited by examiner

*Primary Examiner* — Jack A Lane
(74) *Attorney, Agent, or Firm* — Pillsbury Winthrop Shaw Pittman, LLP (57) ABSTRACT

According to one embodiment, an information recording apparatus has a control unit configured to control mutual transfer of information between each of a disc-shaped recording medium, a cache memory, and a non-volatile memory and the outside, control mutual transfer of information between the disc-shaped recording medium, the cache memory, and the non-volatile memory, and control to set a substituting region corresponding to a defect region generated in the disc-shaped recording medium in the non-volatile memory.

8 Claims, 7 Drawing Sheets

| LBA | Size | Attribute information ||
|---|---|---|---|
| | | Pinned / unpinned | Elimination unavailable / elimination available |
| 120 | 55 | Pinned | Elimination available |
| 240 | 100 | Unpinned | Elimination available |
| 400 | 1 | Unpinned | Elimination unavailable |
| 600 | 2 | Pinned | Elimination unavailable |
| ⋮ | ⋮ | ⋮ | ⋮ |

INFORMATION RECORDING APPARATUS AND CONTROL METHOD THEREOF

CROSS-REFERENCE TO RELATED APPLICATIONS

This application is based upon and claims the benefit of priority from Japanese Patent Application No. 2007-080134, filed Mar. 26, 2007, the entire contents of which are incorporated herein by reference.

BACKGROUND

1. Field

One embodiment of the invention relates to an information recording apparatus that carries out write and readout of information with respect to, for example, a disc-shaped storage medium with a large capacity, such as a hard disc, by using a semiconductor memory as a cache, and also relates to a control method of the information recording apparatus.

2. Description of the Related Art

As is well-known, a hard disc is a large-capacity and reliable information recording medium, and is widespread in many areas, for example, to be used for recording computer data, image data, audio data, and so on in recent years. In addition, the size of the hard disc has been downsized to make it mountable in a portable electronic device.

For the above reason, when downsizing an information recording apparatus that includes such hard disc, a semiconductor memory capable of high-speed write and high-speed readout of information is used as a cache memory for the hard disc, thereby increasing the speed required for write and readout of the information.

That is, the information recording apparatus of this kind carries out write and readout of information with respect to an external host device via the cache memory, and carries out transfer of information between the hard disc and the cache memory. In this manner, write and readout of information as seen from the outside is speeded up.

At present, it is considered to attempt to save battery energy by reducing the number of drives of the hard disc, that is, the number of writes and readouts of information with respect to the hard disc, in a manner that a non-volatile memory is included as a cache with respect to the hard disc in addition to the cache memory. Such an information recording apparatus is called an NV (non volatile)-cache compatible HDD (hard disc drive), and is standardized.

In the information recording apparatus including a hard disc as the information recording medium, in a case where a defect occurs in a specific region (sector) on the hard disc and the reliability of write and readout of information is extremely lowered, a substitution processing for substituting the defect region with another region on the hard disc is carried out.

However, in such a substitution processing, a magnetic head needs to be moved to a substituting region corresponding to the defect region when write and readout of information is carried out with respect to the hard disc. Therefore, additional time is required for such move in the write and readout of information.

Jpn. Pat. Appln. Publication No. 2-109151 discloses a configuration where, when data written in a battery backup RAM (random access memory) is written in a disc, a region in the RAM in which the data was failed to be written in the disc is stored is configured to be a substituting region, in a period where there is no request for write and readout from a host computer.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information recording apparatus has a control unit configured to control mutual transfer of information between each of a disc-shaped recording medium, a cache memory, and a non-volatile memory and the outside, control mutual transfer of information between the disc-shaped recording medium, the cache memory, and the non-volatile memory, and control to set a substituting region corresponding to a defect region generated in the disc-shaped recording medium in the non-volatile memory.

Figure 1:
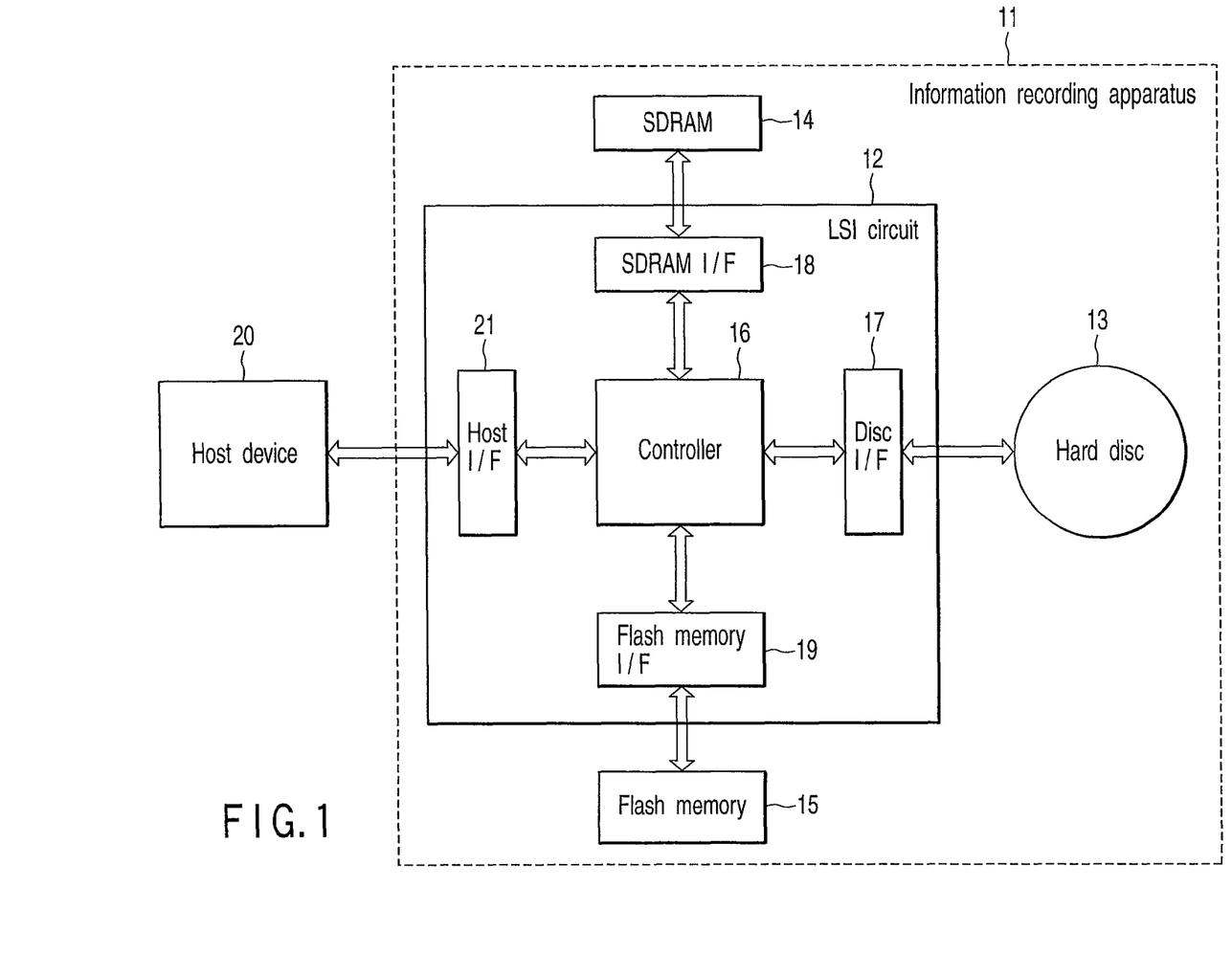
FIG. 1 is a block configuration diagram showing an embodiment of the present invention to explain an outline of an information recording apparatus.

FIG. 1 shows an outline of an information recording apparatus 11 explained in the embodiment. As the information recording apparatus 11 which will be described here, an NV-cache compatible HDD is the target which is standardized by Non Volatile Cache Command Proposal for ATA8-ACS Revision 5, and so on.

The information recording apparatus 11 includes an LSI (large scale integrated) circuit 12 of one chip incorporating various kinds of circuit blocks. Further, a hard disc 13 being a disc-shaped storage medium with a large capacity, an SDRAM (synchronous dynamic random access memory) 14, a flash memory 15, and so on are connected to the LSI circuit 12.

Of these, the SDRAM 14 functions as a buffer and is a cache memory for the hard disc 13. However, not limited to the SDRAM, S (static) RAM, and so on, can be used, for example. In addition, the flash memory 15 is a non-volatile memory (NV-cache) functioning as a cache for the hard disc 13.

Here, the LSI circuit 12 incorporates a controller 16 that works as a control unit for carrying out overall control when the information recording apparatus 11 executes various kinds of processing operations. The LSI circuit 12 incorporates a disc I/F (interface) 17 that connects the controller 16 and the hard disc 13 to be information transferable.

In addition, the LSI circuit 12 incorporates an SDRAM I/F 18 that connects the controller 16 and the SDRAM 14 to be information transferable, a flash memory I/F 19 that connects the controller 16 and the flash memory 15 to be information transferable, a host I/F 21 that connects the controller 16 and an external host device 20 to be information transferable, and so on.

The host device 20 is, for example, a PC (personal computer). When, for example, predetermined application software is executed, the host device 20 executes write and readout of information by using the information recording apparatus 11, and can use the information recording apparatus 11 as a storing destination of the information finally obtained.

In a case where the write and readout of information is carried out with respect to the information recording apparatus 11 in the above manner, the host device 20 generates a command to request write of information and a command to request readout of information with respect to the information recording apparatus 11. These commands are supplied to the controller 16 through the host I/F 21 and analyzed.

In this manner, the controller 16 can control the hard disc 13, the SDRAM 14, the flash memory 15, and so on to carry out write of information supplied from the host device 20 and readout of information to be supplied to the host device 20. In this case, the controller 16 enables mutual transfer of information between the hard disc 13, the SDRAM 14, and the flash memory 15.

To be more specific, in a case where information supplied from the host device 20 is written in the hard disc 13, the controller 16 can choose any of five paths (W1) to (W5) shown hereinafter as an order of writing information.

(W1) host I/F 21—controller 16—disc I/F 17—hard disc 13

(W2) host I/F 21—controller 16—SDRAM I/F 18—SDRAM 14—SDRAM I/F 18—controller 16—disc I/F 17—hard disc 13

(W3) host I/F 21—controller 16—flash memory I/F 19—flash memory 15—flash memory I/F 19—controller 16—disc I/F 17—hard disc 13

(W4) host I/F 21—controller 16—SDRAM I/F 18—SDRAM 14—SDRAM I/F 18—controller 16—flash memory I/F 19—flash memory 15—flash memory I/F 19—controller 16—disc I/F 17—hard disc 13

(W5) host I/F 21—controller 16—flash memory I/F 19—flash memory 15—flash memory I/F 19—controller 16—SDRAM I/F 18—SDRAM 14—SDRAM I/F 18—controller 16—disc I/F 17—hard disc 13

In addition, in a case where information is readout from the hard disc 13 to the host device 20, the controller 16 can choose any of five paths (R1) to (R5) shown hereinafter as an order of reading out information.

(R1) disc I/F 17—controller 16—host I/F 21—host device 20

(R2) disc I/F 17—controller 16—SDRAM I/F 18—SDRAM 14—SDRAM I/F 18—controller 16—host I/F 21—host device 20

(R3) disc I/F 17—controller 16—flash memory I/F 19—flash memory 15—flash memory I/F 19—controller 16—host I/F 21—host device 20

(R4) disc I/F 17—controller 16—SDRAM I/F 18—SDRAM 14—SDRAM I/F 18—controller 16—flash memory I/F 19—flash memory 15—flash memory I/F 19—controller 16—host I/F 21—host device 20

(R5) disc I/F 17—controller 16—flash memory I/F 19—flash memory 15—flash memory I/F 19—controller 16—SDRAM I/F 18—SDRAM 14—SDRAM I/F 18—controller 16—host I/F 21—host device 20

The order of writing information and the order of reading out information described above are determined by the controller 16, for example, in accordance with a content of instruction in a write requesting command and a readout requesting command supplied from the host device 20, a storage location of information, free space of the SDRAM 14 and the flash memory 15, and so on.

As the flash memory 15 described above, a NAND flash memory is widely used. In a case where the NAND flash memory is adopted, the speed of write and readout of information with respect to the flash memory 15 is often slower than the speed of write and readout of information with respect to the SDRAM 14.

Here, of the various types of commands that are set by the above standards and can be executed by the information recording apparatus 11, one which is necessary for describing the present embodiment will be described. A first command designates a logical block address (LBA) in which information is written in the flash memory 15 among LBAs on the hard disc 13.

In addition, a second command designates an LBA to be written in the flash memory 15 in a similar manner as the first command. At the same time, the second command requests readout of information recorded in the LBA from the hard disc 13 and write of the readout information in the flash memory 15.

The first and the second commands described above correspond to PI=0 and PI=1 in Add LBA(s) to NV Cache Pinned Set in the above standards. An LBA that is instructed by the host device 20 to store information in the flash memory 15 is attached with attribute information called pinned.

A third command designates an LBA on the hard disc 13 and requests write of information. In a case where the third command is generated from the host device 20, the controller 16 checks whether the LBA requested for write is associated with the attribute information of pinned. In a case where the LBA is associated with the attribute information of pinned, the third command executes write in a region corresponding to the LBA requested for write in the flash memory 15.

On the other hand, in a case where the LBA requested for write is not associated with the attribute information of pinned, the controller 16 arbitrarily determines whether information should be written in a region corresponding to the designated LBA in the SDRAM 14 or the flash memory 15, or information should be written in the designated LBA in the hard disc 13, and executes such accordingly.

A fourth command designates an LBA on the hard disc 13 and requests readout of information. In a case where the fourth command is generated from the host device 20, and when a region corresponding to the designated LBA is already allocated on the flash memory 15 and it is determined that information newer than the hard disc 13 is stored in the region, the controller 16 needs to readout such information from the flash memory 15.

On the other hand, in a case where there is same information in the hard disc 13 and the flash memory 15, the controller 16 may read out the information from a region corresponding to the LBA requested for readout in the flash memory 15, or may read out information from the designated LBA on the hard disc 13.

In addition, in a case where a region corresponding to the designated LBA is already allocated in the flash memory 15 even though there exists latest data in the hard disc 13, the controller 16 needs to read out the information from the designated LBA on the hard disc 13. When information is read out from the hard disc 13, the controller 16 also determines whether the information should be cached in the SDRAM 14 or in the flash memory 15.

Like the third and the fourth commands described above, out of LBAs that are not associated with the attribute information of pinned among the LBAs that are requested for write and readout of information, an LBA in which information is written in a region allocated in the flash memory 15 is attached with attribute information called unpinned.

Figure 2:
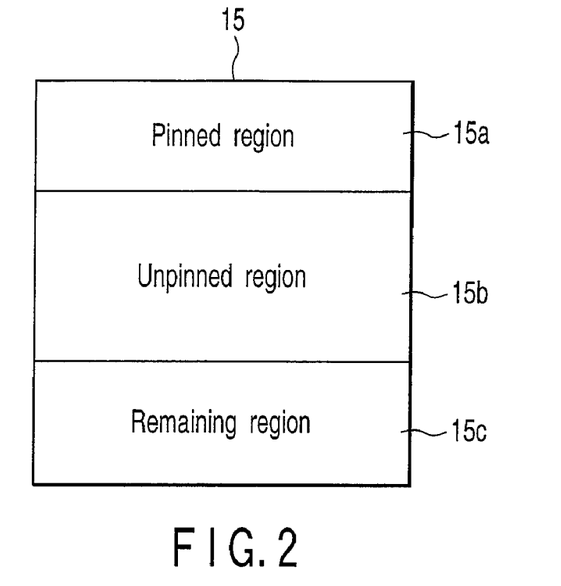
FIG. 2 is a view for explaining a recording region in a flash memory included in the information recording apparatus according to the same embodiment.

The LBA attached with the attribute information of pinned is called a pinned LBA, and a region in the flash memory 15 corresponding to the pinned LBA is called a pinned region. In addition, the LBA attached with the attribute information of unpinned is called an unpinned LBA, and a region in the flash memory 15 corresponding to the unpinned LBA is called an unpinned region. Therefore, as shown in FIG. 2, a pinned region 15a, an unpinned region 15b, and a remaining region 15c are formed in the flash memory 15.

A fifth command requests to form an empty region for a designated size portion in the flash memory 15, and is compatible with Flush NV Cache among the standards described above. In a case where the fifth command is generated from the host device 20, the controller 16 compares size of a current empty region and size of the requested empty region in the flash memory 15.

In a case where the size of the current empty region in the flash memory 15 is smaller than the size of the requested empty region, the controller 16 secures the empty region of designated size in the flash memory 15 by moving information of the designated size or more in a region corresponding to the LBA attached with the attribute information of unpinned (unpinned region 15b) in the flash memory 15 to the hard disc 13.

In this case, the controller 16 determines information in which region among regions corresponding to the LBAs attached with the attribute information of unpinned (unpinned region 15b) in the flash memory 15 is moved to the hard disc 13, that is, in which region in the flash memory 15 an empty region is formed.

A sixth command designates an LBA and requests resetting of the attribute information of pinned (the attribute information of the LBA is made not pinned), and is compatible with Remove LBA(s) From NV Cache Pinned Set in the standards described above. In a case where the sixth command is generated from the host device 20, the controller 16 needs to transfer information stored in a region corresponding to the LBA designated by the sixth command in the flash memory 15 to the hard disc 13 and have the information written. However, a timing thereof is not specified in the standard described above.

Based on the various commands, write and readout of information with respect to the hard disc 13 are executed in the orders (W1) to (W5) and (R1) to (R5) described above.

There is a case where the reliability of hard disc 13 with respect to write and readout of information is extremely lowered due to the generation of a defect in a specific region (sector) due to the situation at the time of manufacturing, part deterioration, and so on. In such a case, in a current situation, a defect region generated on the hard disc 13 is handled by being substituted by another region on the hard disc 13.

However, the substitution processing as described above requires operation of moving a magnetic head (not shown) for carrying out write and readout of information with respect to the hard disc 13 from an original position of carrying out write and readout to a substituting region corresponding to a defect region. Therefore, this results in an adverse effect of speeding up the speed of write and readout of information.

In view of the above, in the present embodiment, a substituting region corresponding to a defect region generated on the hard disc 13 is set in the flash memory 15. Thereby, no operation of zone movement of the magnetic head, retry of rotational speed control of the hard disc 13, and so on takes place. Thus, write and readout of information can be achieved at high speed with high reliability.

In this case, a region set as a substituting region in the flash memory 15 is managed as an LBA on the hard disc 13, and attribute information showing elimination unavailable in order to prevent unintentional elimination is added to the LBA. This attribute information is written in a management table for managing an LBA together with the attribute information showing pinned and unpinned described above.

Figure 3:
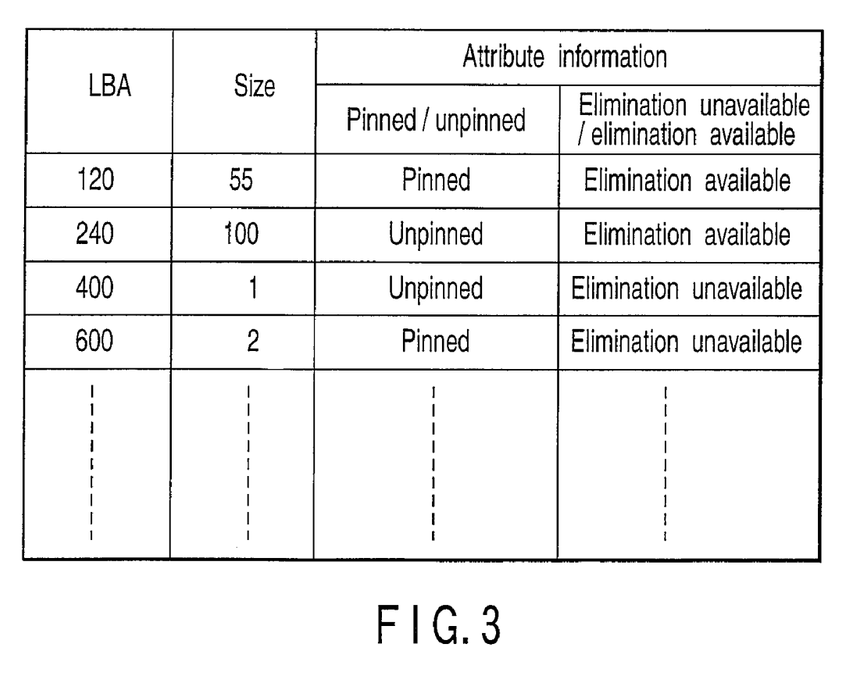
FIG. 3 is a view for explaining an example of a management table of the flash memory included in the information recording apparatus according to the same embodiment.

FIG. 3 shows an example of the management table for managing the attribute information added to each LBA. The management table is stored, for example, in the SDRAM 12 or the flash memory 15 described above. That is, the management table is associated with a beginning LBA, and size and attribute information from the beginning LBA.

The attribute information includes an item of pinned/unpinned showing whether the attribute information of pinned is added or the attribute information of unpinned is added to the LBA currently, and an item of elimination unavailable/elimination available showing whether the LBA is currently used as a substituting region and cannot be eliminated, or is not used as a substituting region and can be eliminated.

Figure 4:
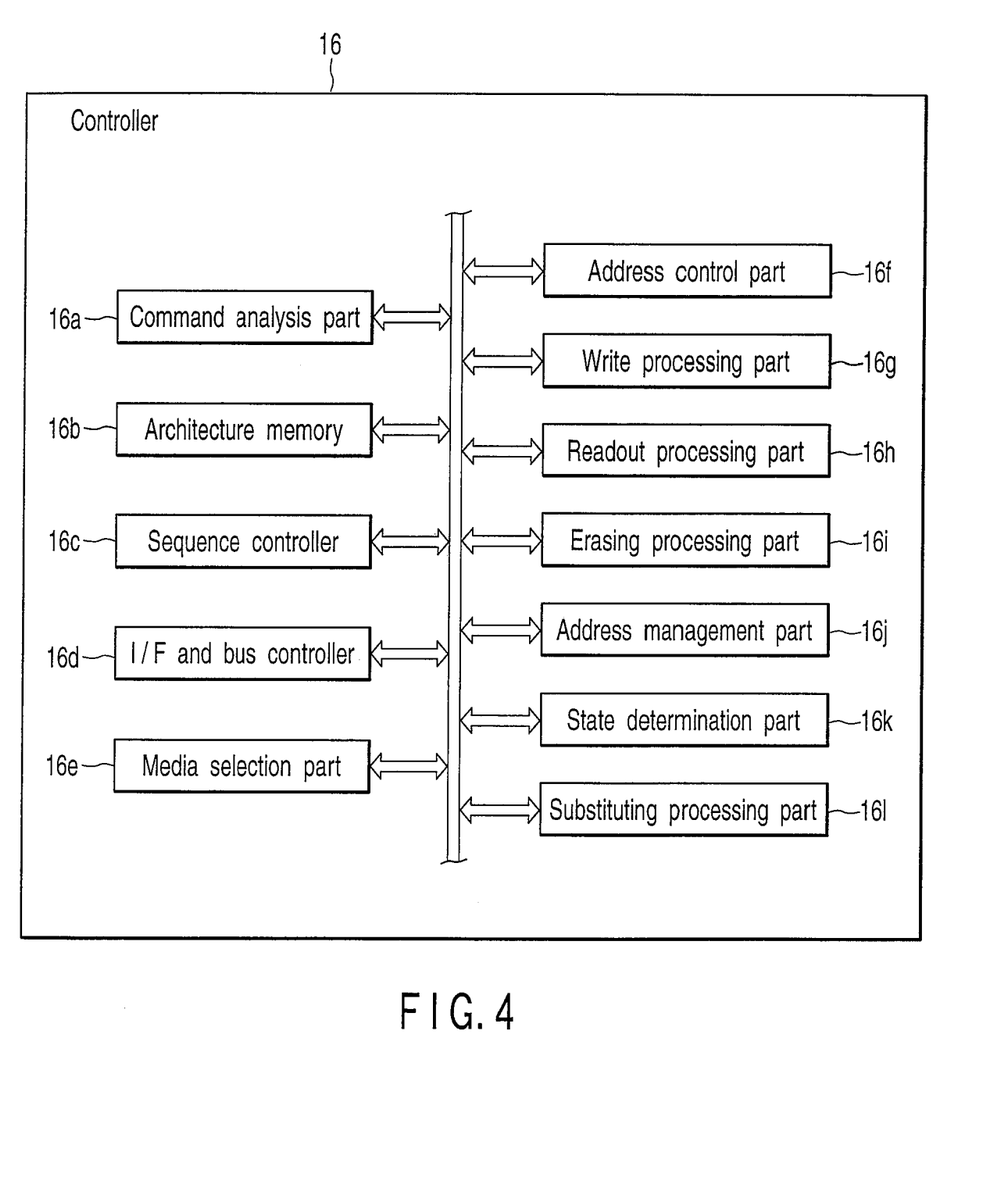
FIG. 4 is a block configuration diagram for explaining an example of a controller included in the information recording apparatus according to the same embodiment.

FIG. 4 shows an example of the controller 16 described above. The controller 16 has a command analysis part 16a which decodes and analyzes a command supplied from the host device 20. By the analysis result of this command analysis part 16a, software in an architecture memory 16b is identified, and an operation procedure is set in a sequence controller 16c.

The sequence controller 16c controls a flow of information via an I/F and a bus controller 16d. For example, when write and readout of information are carried out, a media selection part 16e identifies the hard disc 13, the SDRAM 14, or the flash memory 15, and also an address control part 16f identifies a write address and a readout address.

At the time of write of information, a write processing part 16g executes transfer processing or the like of write information. In addition, at the time of readout of information, a readout processing part 16h executes transfer processing or the like of readout information.

Further, the controller 16 is provided with an erasing processing part 16i. This erasing processing part 16i executes erasing processing of information recorded in the SDRAM 14 and the flash memory 15. The erasing processing part 16i can also execute erasing processing of information recorded in the hard disc 13.

In addition, the controller 16 is provided with an address management part 16j. This address management part 16j collectively manages addresses of recorded regions, non-recorded regions, and so on of the SDRAM 14, the flash memory 15, and the hard disc 13.

Further, the controller 16 is provided with a state determination part 16k. The state determination part 16k monitors a rotating state of the hard disc 13, a state of remaining capacity of the hard disc 13, the SDRAM 14, and the flash memory 15, and so on.

In addition, the controller 16 is provided with a substitution processing part 16*l*. The substitution processing part 16*l* manages the substitution processing that sets a substituting region with respect to a defect region generated on the hard disc 13 in the flash memory 15, and also controls write and rewrite of the management table described above.

Figure 5:
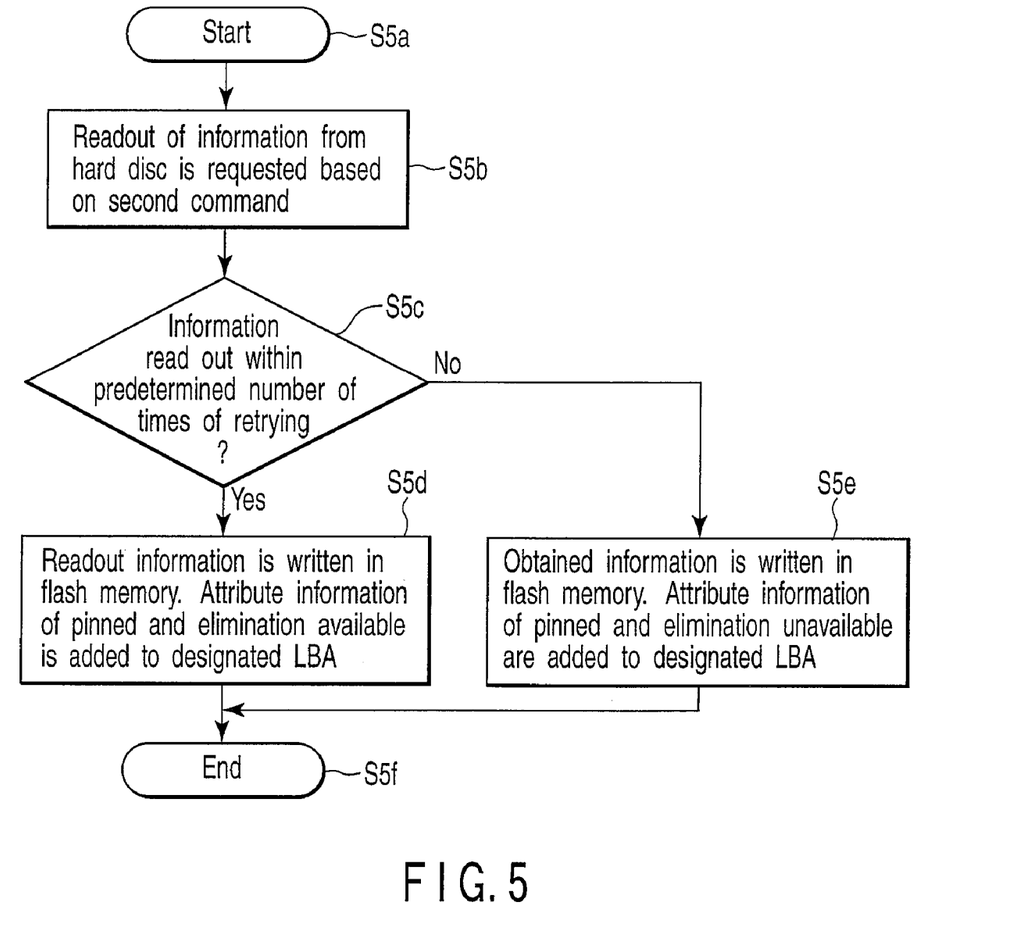
FIG. 5 is a flowchart for explaining a first example of a substitution processing operation of a defect region carried out by the information recording apparatus according to the same embodiment.

Here, each of FIGS. 5 to 8 shows an example of a processing operation to set a substituting region for a defect region in the flash memory 15 when the defect region is generated on the hard disc 13. First, FIG. 5 shows a case where the processing is started (step S5*a*), and readout of information from the hard disc 13 is requested based on the second command from the host device 20 in step S5*b*.

In this case, in step S5*c*, the controller 16 discriminates whether information was readout or not from the LBA on the hard disc 13 designated by the second command within a range of the predetermined number of times of retrying set in advance.

In a case where it is determined that the information was readout (YES), the controller 16 writes the information read out from the hard disc 13 in the region in the flash memory 15 allocated corresponding to the LBA designated by the second command and adds attribute information of pinned and elimination available to the designated LBA in step S5*d*. Then, the processing is terminated (step S5*f*).

In addition, in a case where it is determined that information was not read out from the hard disc 13 within the range of the predetermined number of times of retrying in the above step S5*c* (NO), the controller 16 obtains information of the LBA designated by the second command on the hard disc 13 by retrying for more than the predetermined number of times of retrying described above, and carrying out other processing set in advance such as interpolation processing in step S5*e*. Then, the controller 16 writes the information thus obtained in a region in the flash memory 15 allocated corresponding to the LBA designated by the second command, adds the attribute information of pinned and elimination unavailable to the designated LBA, and terminates the processing (step S5*f*).

Figure 6:
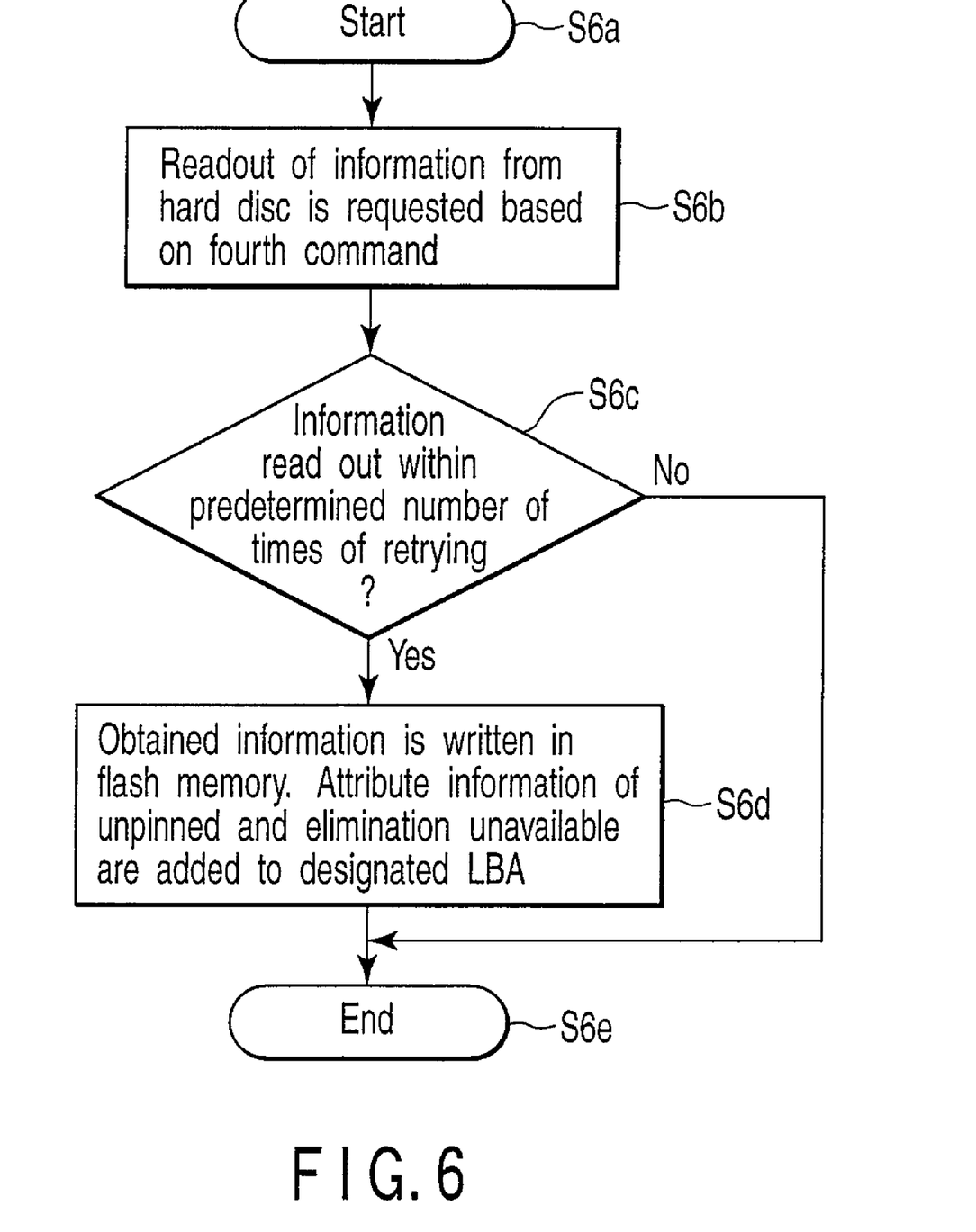
FIG. 6 is a flowchart for explaining a second example of a substitution processing operation of a defect region carried out by the information recording apparatus according to the same embodiment.

FIG. 6 shows a case where processing is started (step S6*a*), and readout of information from the hard disc 13 is requested based on the fourth command described above from the host device 20 in step S6*b*.

In this case, the controller 16 discriminates whether information was readout or not from the LBA on the hard disc 13 designated by the fourth command within the range of the predetermined number of times of retrying set in advance in step S6*c*. In a case where it is determined that the information was read out (YES), the processing is terminated (step S6*e*).

In a case where the controller 16 controls the information read out from the hard disc 13 to be written in the region in the flash memory 15 allocated corresponding to the LBA designated by the fourth command, the attribute information of elimination available is added to the designated LBA, the attribute information of unpinned is added to the LBA to which the attribute information of pinned is not added among the designated LBAs, and then the processing is terminated (step S6*e*).

In addition, in a case where it is determined that the information was not read out from the hard disc 13 within the range of the predetermined number of times of retrying in the above step S6*c* (NO), the controller 16 obtains information of the LBA on the hard disc 13 designated by the fourth command by retrying for more than the predetermined number of times of retrying described above, and carrying out other processing set in advance such as interpolation processing in step S6*d*.

Thereafter, the controller 16 writes the obtained information in the region in the flash memory 15 allocated corresponding to the LBA designated by the fourth command, and adds the attribute information of elimination unavailable to the designated LBA. Together therewith, the controller 16 adds the attribute information of unpinned to the LBA to which the attribute information of pinned is not added among the designated LBAs, and terminates the processing (step S6*e*).

Figure 7:
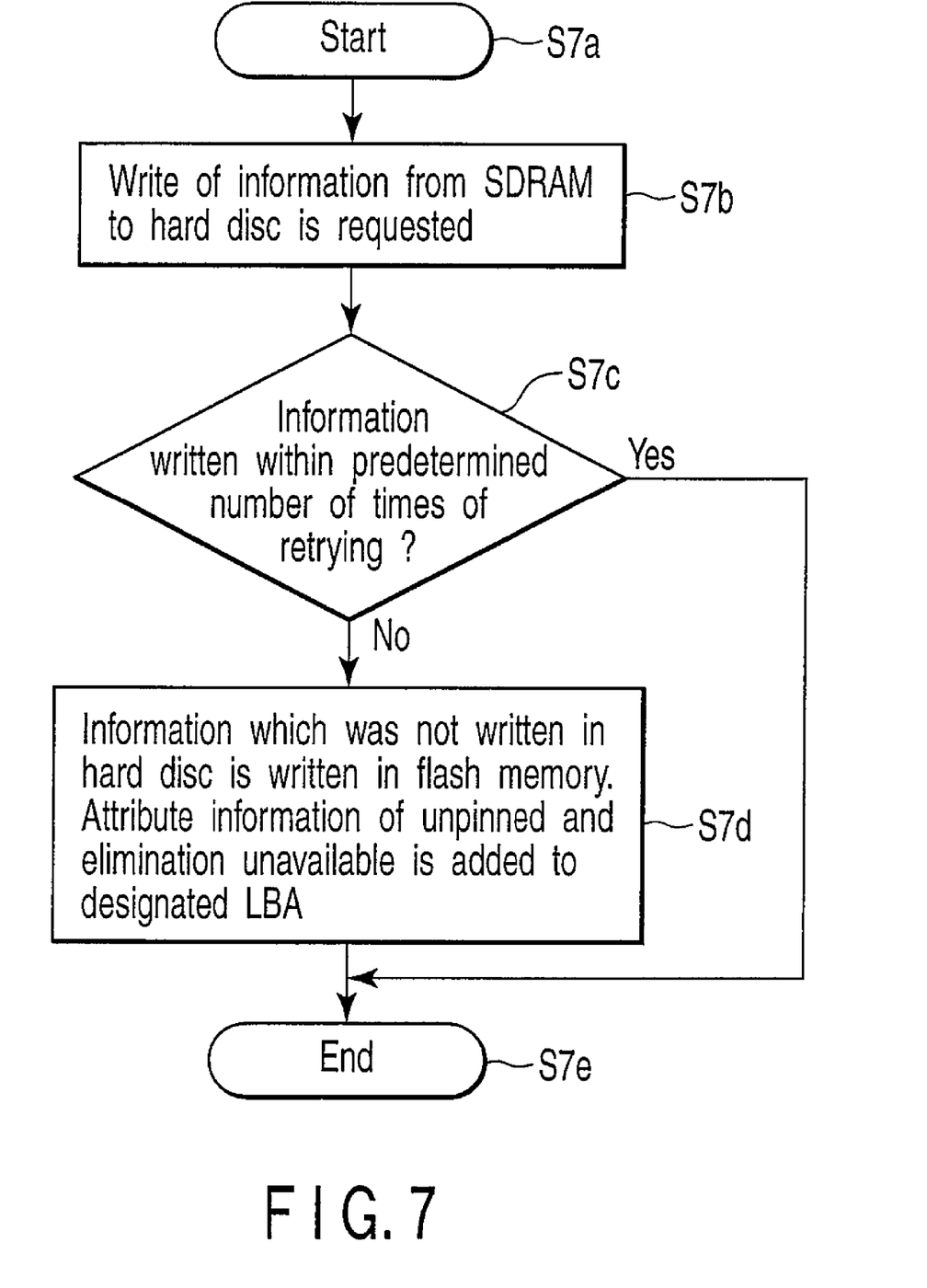
FIG. 7 is a flowchart for explaining a third example of a substitution processing operation of a defect region carried out by the information recording apparatus according to the same embodiment.

FIG. 7 shows a case where processing is started (step S7*a*), and write of information from the SDRAM 14 to the hard disc 13 is requested in step S7*b*. This request for write is achieved, for example, in a case where the controller 16 controls information from the host device 20 to be written in the hard disc 13 via the SDRAM 14 in the third command described above.

In this case, the controller 16 determines whether information was written in the LBA on the hard disc 13 designated by the host device 20 within the range of the predetermined number of times of retrying set in advance in step S7*c*. In a case where the controller 16 determines the information was written (YES), the processing is terminated (step S7*e*).

In a case where the information written in the hard disc 13 by the controller 16 is controlled to be also written in the region in the flash memory 15 allocated corresponding to the LBA designated by the host device 20, the attribute information of elimination available is added to the designated LBA, the attribute information of unpinned is added to the LBA to which the attribute information of pinned is not added among the designated LBAs, and then the processing is terminated (step S7*e*).

In addition, in a case where it is determined that information was not written in the hard disc 13 within the range of the predetermined number of times of retrying in the above step S7*c* (NO), the controller 16 writes the information which could not be written in the hard disc 13 in the region in the flash memory 15 allocated corresponding to the LBA designated by the host device 20 in step S7*d*.

Thereafter, the controller 16 adds the attribute information of elimination unavailable to the LBA designated by the host device 20, adds the attribute information of unpinned to the LBA to which the attribute information of pinned is not added among the designated LBAs, and then terminates the processing (step S7*e*).

Figure 8:
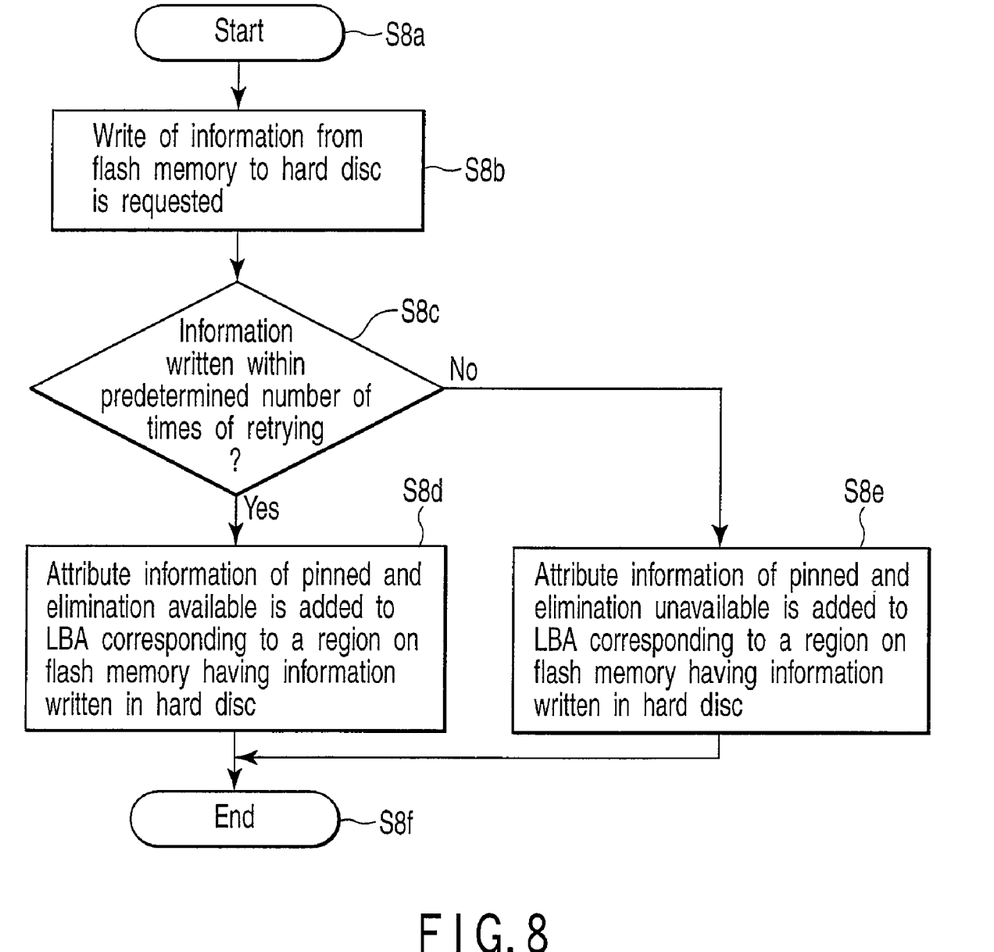
FIG. 8 is a flowchart for explaining a fourth example of a substitution processing operation of a defect region carried out by the information recording apparatus according to the same embodiment.

Next, FIG. 8 shows a case where processing is started (step S8*a*), and write of information from the flash memory 15 to the hard disc 13 is requested in step S8*b*. This request for write is achieved, for example, in a case where the controller 16 controls information from the host device 20 to be written in the hard disc 13 via the SDRAM 14 and the flash memory 15 in a state where the third command is generated under generation of the first command described above.

In this case, the controller 16 determines whether information was written in the LBA on the hard disc 13 designated by the host device 20 within the range of the predetermined number of times of retrying set in advance in step S8*c*.

In a case where the controller 16 determines the information was written (YES), the controller 16 adds the attribute information of pinned and elimination available to an LBA corresponding to the region in the flash memory 15 where the information written in the hard disc 13 is stored in step S8*d*, and then terminates the processing (step S8*f*).

In addition, in a case where it is determined that the information was not written in the hard disc 13 in the range of the predetermined number of times of retrying in the above step S8c (NO), the controller 16 adds the attribute information of pinned and elimination unavailable to an LBA corresponding to a region in the flash memory 15 in which the information not written in the hard disc 13 is stored in step S8e, and terminates the processing (step S8f).

According to the embodiment described above, a substituting region with respect to a defect region generated on the hard disc 13 is configured to be able to be set in the flash memory 15. Therefore, at the time of write and readout of information with respect to the hard disc 13, moving of the magnetic head to a substituting region, operation of controlling again the rotational speed of the hard disc 13, and so on become unnecessary, and write and readout of information can be achieved at high speed with high reliability.

In addition, an LBA of a defect region on the hard disc 13, that is, an LBA of a region substituted by the flash memory 15 is added with the attributable information of elimination unavailable on the management table of the LBA. Therefore, invalidation of substitution processing due to careless elimination can reliably be prevented.

Further, in a case where requests of write and readout of information with respect to the hard disc 13 is generated from the host device 20, special processing in which a defect region in the hard disc 13 is substituted by the flash memory 15 is not necessary, and write and readout of information can be performed by using a control routine of a normal NV-cache-compatible HDD as it is.

To be more specific, for example, it is assumed that a request for readout of a region from an LBA 390 to an LBA 410 is generated from the host device 20 in a state where an LBA 400 on the hard disc 13 becomes a defect region and is substituted by the flash memory 15.

In this case, the controller 16 can know that information of the LBA 400 exists in the flash memory 15 from the management table. In addition, the controller 16 can also know that information other than the information of the LBA 400 does not exist on the flash memory 15.

For this reason, the controller 16 carries out readout of information of regions from LBAs 390 to 399 and 401 to 410 with respect to the hard disc 13, and controls the readout information to be stored in the SDRAM 14. Thereafter, the controller 16 reads out information of the LBA 400 from the flash memory 15 and controls the readout information to be stored in the SDRAM 14. Then, the controller 16 connects pieces of information stored in the SDRAM 14 and connects such pieces of information in an order of LBAs 390 to 410, and controls the information to be transferred to the host device 20.

The control routine of in readout, as described above, is a normal readout routine that is executed as long as the information of the LBA 400 is found to exist in the flash memory 15 by referring to the management table regardless of whether the LBA 400 is a substitute region or not.

Further, if attribute information showing that information on the flash memory 15 is the latest is added to the management table, processing of readout of information is sped up even more effectively.

When a defect region on the hard disc 13 is substituted by the flash memory 15, precautions as described below are necessary with respect to the management table. First, with respect to an LBA to which the attribute information of unpinned and elimination unavailable is added, information of the flash memory 15 corresponding to the LBA needs to be excluded from an elimination target in order not to create an empty region by moving the information to the hard disc 13, even when the fifth command described above is generated.

In addition, with respect to an LBA to which the attribute information of pinned and elimination unavailable is added, the attribute information is changed in a manner that pinned is changed to unpinned and elimination unavailable is succeeded as it is in a case where the sixth command described above is generated.

Further, in a case where a situation that requires a large amount of regions becomes necessary in the flash memory 15, such as securing a large amount of the pinned region 15a in the flash memory 15, is generated, information substituted by the flash memory 15 may be substituted by regions other than a defect region on the hard disc 13. In this case, attribute information of a target LBA is ignored even when the attribute information is that of elimination unavailable, or rewritten to elimination available.

In addition, the predetermined number of times of retrying set in advance, which is a threshold value for determining whether write and readout of information were carried out properly, for example, is a value independently set by each manufacturer by taking into account performance, safety, and so on of the hard disc 13.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information recording apparatus comprising:
a disc-shaped recording medium;
a cache memory configured to be a cache for the disc-shaped recording medium;
a non-volatile memory with a speed of write and readout of information slower than the cache memory, and configured to be a cache for the disc-shaped recording medium; and
a control unit configured to control mutual transfer of information between each of the disc-shaped recording medium, the cache memory, and the non-volatile memory and the outside, control mutual transfer of information between the disc-shaped recording medium, the cache memory, and the non-volatile memory, and control to set a substituting region corresponding to a defect region generated in the disc-shaped recording medium in the non-volatile memory,
wherein, in a case when an address of the disc-shaped recording medium from which information is read out is designated by a host, and a command that requests write of the information read out from the disc-shaped recording medium in a region of the non-volatile memory allocated corresponding to the address is input,
a situation where readout with respect to the region on the disc-shaped recording medium shown by the address designated by the command does not properly terminate within the predetermined number of readouts and the readout is completed by requiring the number of times of retrying over the predetermined number of times of retrying, and the region on the disc-shaped recording medium is newly registered as the defect region, and
the control unit is configured to allocate a substituting region corresponding to a defect region on the disc-shaped recording medium to the non-volatile memory, and also add attribute information showing that the substituting region cannot be eliminated from the non-volatile memory and attribute information of pinned on a management table that manages the non-volatile memory.

2. An information recording apparatus comprising:
a disc-shaped recording medium;
a cache memory configured to be a cache for the disc-shaped recording medium;
a non-volatile memory with a speed of write and readout of information slower than the cache memory, and configured to be a cache for the disc-shaped recording medium; and
a control unit configured to control mutual transfer of information between each of the disc-shaped recording medium, the cache memory, and the non-volatile memory and the outside, control mutual transfer of information between the disc-shaped recording medium, the cache memory, and the non-volatile memory, and control to set a substituting region corresponding to a defect region generated in the disc-shaped recording medium in the non-volatile memory,
wherein,
in a case when a command that requests readout of information with respect to the disc-shaped recording medium is input from a host,
a situation where readout with respect to the region on the disc-shaped recording medium shown by addresses designated by the command does not properly terminate within the predetermined number of readouts and the readout is completed by requiring the number of times of retrying over the predetermined number of times of retrying, and the region on the disc-shaped recording medium is newly registered as the defect region,
the control unit is configured to allocate a substituting region corresponding to a defect region on the disc-shaped recording medium to the non-volatile memory, add attribute information showing that the substituting region cannot be eliminated from the non-volatile memory on a management table that manages the non-volatile memory, and add attribute information of unpinned to the address to which attribute information of pinned is not added among the designated addresses.

3. An information recording apparatus comprising:
a disc-shaped recording medium;
a cache memory configured to be a cache for the disc-shaped recording medium;
a non-volatile memory with a speed of write and readout of information slower than the cache memory, and configured to be a cache for the disc-shaped recording medium; and
a control unit configured to control mutual transfer of information between each of the disc-shaped recording medium, the cache memory, and the non-volatile memory and the outside, control mutual transfer of information between the disc-shaped recording medium, the cache memory, and the non-volatile memory, and control to set a substituting region corresponding to a defect region generated in the disc-shaped recording medium in the non-volatile memory,
wherein,
in a case when a command that requests write of information in the disc-shaped recording medium is input from the host, and it is determined that write of whole or part of an address designated by the command in the disc-shaped recording medium is carried out,
a situation where write with respect to a region on the disc-shaped recording medium shown by the address designated by the command does not properly terminate, and the region on the disc-shaped recording medium in which the write is failed is newly registered as the defect region,
the control unit is configured to allocate a region on the non-volatile memory as a substituting region with respect to the address in which the write is failed, write information from the cache memory to a substituting region in the non-volatile memory, and add attribute information showing that the substituting region cannot be eliminated from the non-volatile memory and attribute information of unpinned on a management table that manages the non-volatile memory.

4. An information recording apparatus comprising:
a disc-shaped recording medium;
a cache memory configured to be a cache for the disc-shaped recording medium;
a non-volatile memory with a speed of write and readout of information slower than the cache memory, and configured to be a cache for the disc-shaped recording medium; and
a control unit configured to control mutual transfer of information between each of the disc-shaped recording medium, the cache memory, and the non-volatile memory and the outside, control mutual transfer of information between the disc-shaped recording medium, the cache memory, and the non-volatile memory, and control to set a substituting region corresponding to a defect region generated in the disc-shaped recording medium in the non-volatile memory,
wherein,
in a case that the whole or part of unpinned regions that are not attached with elimination-unavailable attribute is rewritten in the disc-shaped recording medium when a need to secure a region on the non-volatile memory occurs,
when a situation where the write with respect to the disc-shaped recording medium does not properly terminates and a region in which the write in the disc-shaped recording medium is newly registered as a defect region,
the control unit is configured to maintain a region in which information to be rewritten in the disc-shaped recording medium is recorded on the non-volatile memory on the non-volatile memory as a substituting region to record the information, and add attribute information showing that the substituting region cannot be eliminated from the non-volatile memory on a management table that manages the non-volatile memory.

5. The information recording apparatus according to claim 1, wherein
the management table associates an address showing a defect region on the disc-shaped recording medium to attribute information that shows a substituting region of the non-volatile memory allocated by the address cannot be eliminated from the non-volatile memory.

6. The information recording apparatus according to claim 2, wherein
the control unit is configured to create a management table that associates an address showing a defect region on the disc-shaped recording medium to attribute information that shows a substituting region of the non-volatile memory allocated by the address cannot be eliminated from the non-volatile memory.

7. The information recording apparatus according to claim 3, wherein the control unit is configured to create a management table that associates an address showing a defect region on the disc-shaped recording medium to attribute information that shows a substituting region of the non-volatile memory allocated by the address cannot be eliminated from the non-volatile memory.

8. The information recording apparatus according to claim 4, wherein the control unit is configured to create a management table that associates an address showing a defect region on the disc-shaped recording medium to attribute information that shows a substituting region of the non-volatile memory allocated by the address cannot be eliminated from the non-volatile memory.

* * * * *